US007555749B2

(12) United States Patent
Wickham et al.

(10) Patent No.: US 7,555,749 B2
(45) Date of Patent: Jun. 30, 2009

(54) SOFTWARE UPDATING SYSTEM AND METHOD

(75) Inventors: Robert T. Wickham, Sammamish, WA (US); Vinay Deo, Redmond, WA (US); Shafqat U. Khan, Redmond, WA (US); Shantanu Sardesai, Sammamish, WA (US); Adam D. Welker, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 461 days.

(21) Appl. No.: 10/385,391

(22) Filed: Mar. 10, 2003

(65) Prior Publication Data

US 2004/0181787 A1   Sep. 16, 2004

(51) Int. Cl.
G06F 9/44 (2006.01)
(52) U.S. Cl. .................. 717/168; 717/170; 717/172; 717/173
(58) Field of Classification Search .......... 717/168–178
See application file for complete search history.

(56) References Cited

U.S. PATENT DOCUMENTS

| | | | |
|---|---|---|---|
| 5,493,682 A | | 2/1996 | Tyra et al. |
| 5,752,042 A * | | 5/1998 | Cole et al. ................. 717/173 |
| 5,805,891 A | | 9/1998 | Bizuneh et al. |
| 5,978,911 A * | | 11/1999 | Knox et al. ..................... 713/1 |
| 5,999,740 A * | | 12/1999 | Rowley ....................... 717/173 |
| 6,006,034 A * | | 12/1999 | Heath et al. .................. 395/712 |
| 6,009,274 A * | | 12/1999 | Fletcher et al. ............. 717/173 |
| 6,074,434 A * | | 6/2000 | Cole et al. .................. 717/173 |
| 6,110,228 A | | 8/2000 | Albright et al. |
| 6,123,737 A * | | 9/2000 | Sadowsky ................... 717/173 |
| 6,151,643 A * | | 11/2000 | Cheng et al. ................. 710/36 |
| 6,282,709 B1 * | | 8/2001 | Reha et al. ................... 717/175 |
| 6,353,926 B1 * | | 3/2002 | Parthesarathy et al. ....... 717/170 |
| 6,360,366 B1 * | | 3/2002 | Heath et al. ................. 717/178 |
| 6,763,403 B2 * | | 7/2004 | Cheng et al. .................. 710/36 |
| 6,976,251 B2 * | | 12/2005 | Meyerson ................... 717/173 |
| 6,986,134 B1 * | | 1/2006 | Foster ......................... 717/177 |
| 7,003,767 B2 * | | 2/2006 | Larkin ........................ 717/172 |
| 2002/0078222 A1 * | | 6/2002 | Compas et al. ............. 709/232 |
| 2002/0100036 A1 * | | 7/2002 | Moshir et al. ............... 717/173 |
| 2002/0174422 A1 * | | 11/2002 | Kelley et al. ................ 717/178 |
| 2003/0097579 A1 * | | 5/2003 | England et al. ............. 713/193 |
| 2003/0191958 A1 * | | 10/2003 | Gartside et al. ............ 713/200 |
| 2004/0003266 A1 * | | 1/2004 | Moshir et al. ............... 713/191 |
| 2004/0068481 A1 * | | 4/2004 | Seshadri et al. ................ 707/1 |
| 2004/0205709 A1 * | | 10/2004 | Hiltgen et al. .............. 717/115 |

OTHER PUBLICATIONS

N. Muller, "Focus on OpenView: A Guide to Hewlett-Packard's Network and Systems Management Platform", 1995, pp. 1-291.*

(Continued)

*Primary Examiner*—Lewis A Bullock, Jr.
*Assistant Examiner*—Jue S Wang
(74) *Attorney, Agent, or Firm*—Lee & Hayes, PLLC (57) ABSTRACT

In one embodiment, a server/client system, configured to update client software, generates audit data by analyzing a client's file configuration with respect to rules within an update catalog. The audit data is then moved to the server, where updates indicated by the audit data may be approved. The approved updates are then distributed from the server to the client for installation.

22 Claims, 9 Drawing Sheets

OTHER PUBLICATIONS

SafePatch, "SafePatch Version 0.9 User Manual", Mar. 1999.*
Patchlink, "PatchLink Update 4.0 White Paper Cross-platform Security Patch Management", 2002, retrieved from: http://web.archive.org/web/20020803030626/http://www.patchlink.com/support/documents/PLUS4_Whitepaper.pdf.*
Tulisato et al., "Upgrading to Lotus Notes and Domino 6", Dec. 2002, IBM, Section 3.9, Chapter 16.*
Barry, Evelyn, Ph.D., Mays Business School, Texas A&M University, "Software Evolution, Volatility and Lifecycle Maintenance Patterns: A Longitudinal Analysis Synopsis," 2002 IEEE, Inc., pp. 474-477.
Orso, Alessandro, et al., College of Computing, Georgia Institute of Technology, "A Technique for Dynamic Updating of Java Software," 2002 IEEE, Inc., pp. 649-658.
Shirabad, Jelber Sayyad, et al., School of Information Technology & Engineering, University of Ottawa, Ottawa, Canada, "Supporting Software Maintenance by Mining Software Update Records," 2001 IEEE, Inc., pp. 22-31.
Bialek, Robert Pawel, Dept. of Computer Science, University of Copenhagen, "The Architecture of a Dynamically Updatable, Component-based System," Work-in-progress Report, Mar. 2002, IEEE, Inc., pp. 1012-1016.
Software Engineering Standards Committee of the IEEE Computer Society, "IEEE Standard for Software Quality Assurance Plans," 1998 IEEE, Inc., title pages plus pp. 1-15.
Waqar, Umer, et al., Dept. of Electrical & Computer Engineering, Concordia University, Montreal, Canada, "A Formal Approach for Software Maintenance," Proceedings of the Int'l. Conference on Software Maintenance (ICSM'02), 2002 IEEE, Inc., 10 pages.
Manufacturing Engineering, "Tech Front," Feb. 1996, pp. 28 & 30.
Kitzhofer, "RS/6000 ATM Cookbook", Copyright 2000, International Busines Machines Corporation 2000, pp. 318.
Pawik, "Directions on Microsoft", retrieved on Feb. 28, 2007, at <<http://www.directionsonmicrosoft.com/sample/DOMIS/update/2002/05may/0502sustep.htm>>, Apr. 22, 2002, pp. 13.

* cited by examiner

SOFTWARE UPDATING SYSTEM AND METHOD

TECHNICAL FIELD

The disclosure relates to installation of software updates.

BACKGROUND

A very large number of software applications, programs and files used by computers need periodic updates, which are frequently referred to a "patches". Many updates are of vital importance, such as those having to do with security or application functionality.

Installing and maintaining software within an enterprise network environment is a major cost to corporations and organizations. This is particularly the case where large numbers of networked computers are involved, each computer having a large number of programs and each program having a large number of possible revision levels. As the number of computers within a network increases, and the number of files, programs and associated versions of the files and programs on each computer also increases, it becomes progressively harder to maintain each computer in a condition that maximizes security and functionality.

Additionally, workstation down time is increasingly an issue, due in part to the time required to reboot computers after application of an update. The known process by which client computers are updated has created time consuming cycles during which updates are applied and the computer is rebooted. Accordingly, productive time is lost.

Moreover, the IT technician is not provided with any metrics describing important data related to the time that updates become available, the time such updates become approved, and the time taken to fix such hazards by installing an update. Consequently, the progress toward the goal of timely application of all updates is not well understood or aggressively pursued at present.

SUMMARY

In one embodiment, a server/client system, configured to update client software, generates audit data by analyzing a client's file configuration with respect to rules within an update catalog. The audit data is then moved to the server, where updates indicated by the audit data may be approved. The approved updates are then distributed from the server to the client for installation.

BRIEF DESCRIPTION OF THE DRAWINGS

The following detailed description refers to the accompanying figures. In the figures, the left-most digits(s) of a reference number identifies the figure (FIG.) in which the reference number first appears. Moreover, the same reference numbers are used throughout the drawings to reference like features and components.

DETAILED DESCRIPTION

Figure 1:
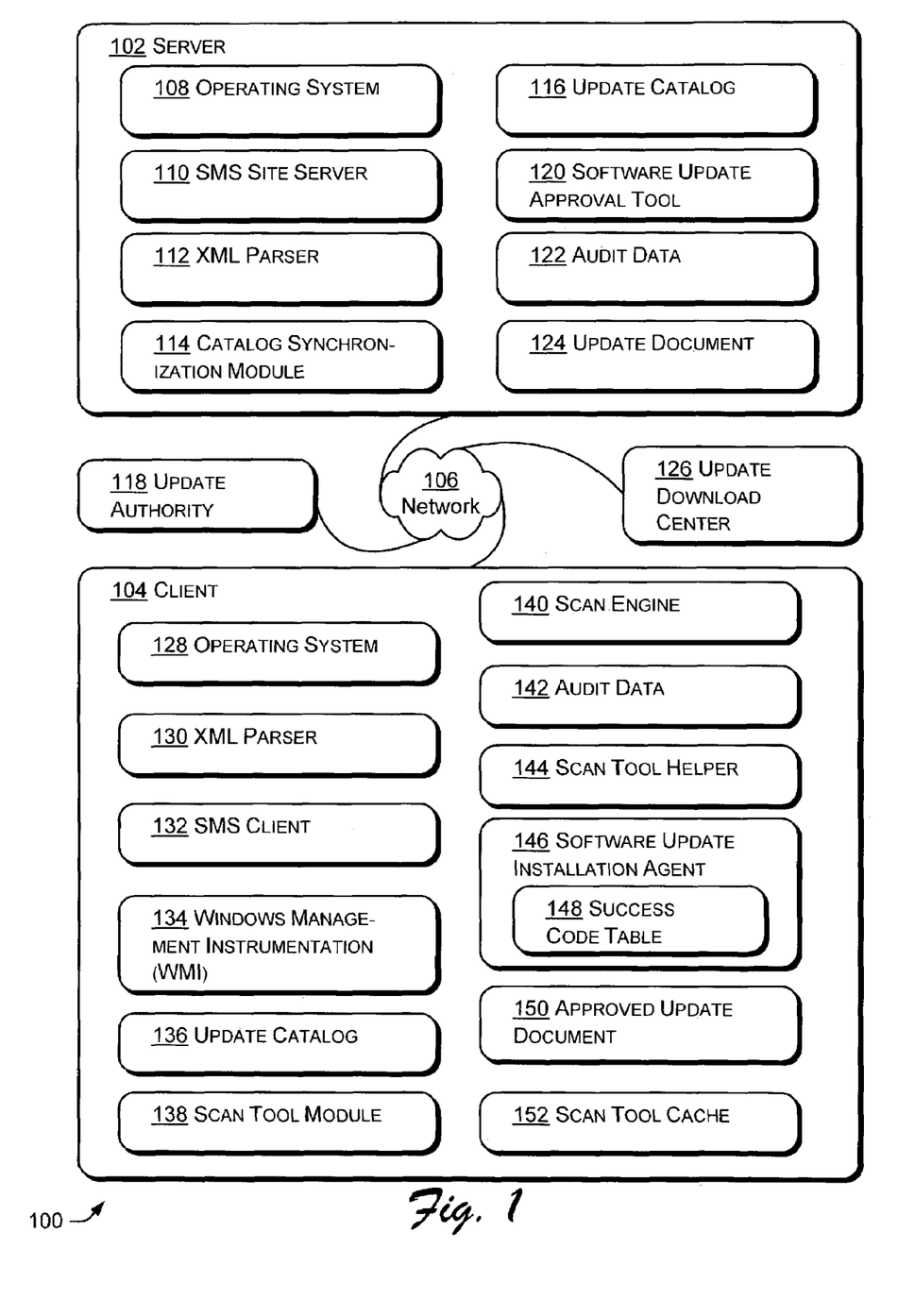
FIG. 1 is a block diagram describing the configuration of an exemplary software updating system.

FIG. 1 shows a network environment within which an exemplary software updating system 100 may operate. A server 102 is connected to a client 104 by any type of network 106, such as the Internet or an intranet within an enterprise. The server 102 is typically configured with an operating system 108. Software configured for asset inventory, software distribution and infrastructure security, such as Microsoft Systems Management Server (SMS) site server 110 or similar product may also be present. Additionally, an XML parser 112 is installed.

A catalog synchronization module 114 allows the server 102 to obtain an update catalog 116 from an update authority 118. The update catalog 116 may be configured as an XML document, and includes information about the availability of software updates ("patches") and the version of the software to which they should be applied. Additionally, the update catalog 116 may include complex rules, typically in the form of Boolean logic, which prescribes the conditions under which individual software updates should be installed. In an over-simplified example, the rules may indicate that an update should be installed if the target application is greater than revision 2, but only if revision 4 of another program is present. The update authority 118 may be a trusted software source, such as Microsoft Corporation, wherein the trusted software source maintains information concerning software updates.

Therefore, the catalog synchronization module 114 is configured to communicate with the update authority 118, to maintain the resident copy of the update catalog 116 in current form. Additionally, the catalog synchronization module 114 is configured to check for a code (an "authenticode") to determine if the update catalog 116 is authentic, or has been corrupted, tampered with or otherwise rendered useless or harmful.

An exemplary software update approval tool 120 may be configured as a wizard to guide a user (such as an IT (information technology) technician) on the server 102 through the deployment of software updates on one or more client computers 104. In particular, the software update approval tool 120 is configured to allow the user to approve or reject application of software updates for installation on one or more client computers 104, wherein the updates were recommended by audit data 122 received from the client 104. Information disclosing the file configuration on the client—including file versions present and the present update level—is obtained from audit data 122 which was transferred from the client to the server via SMS, as will be seen in greater detail below.

Figures 2, 3:
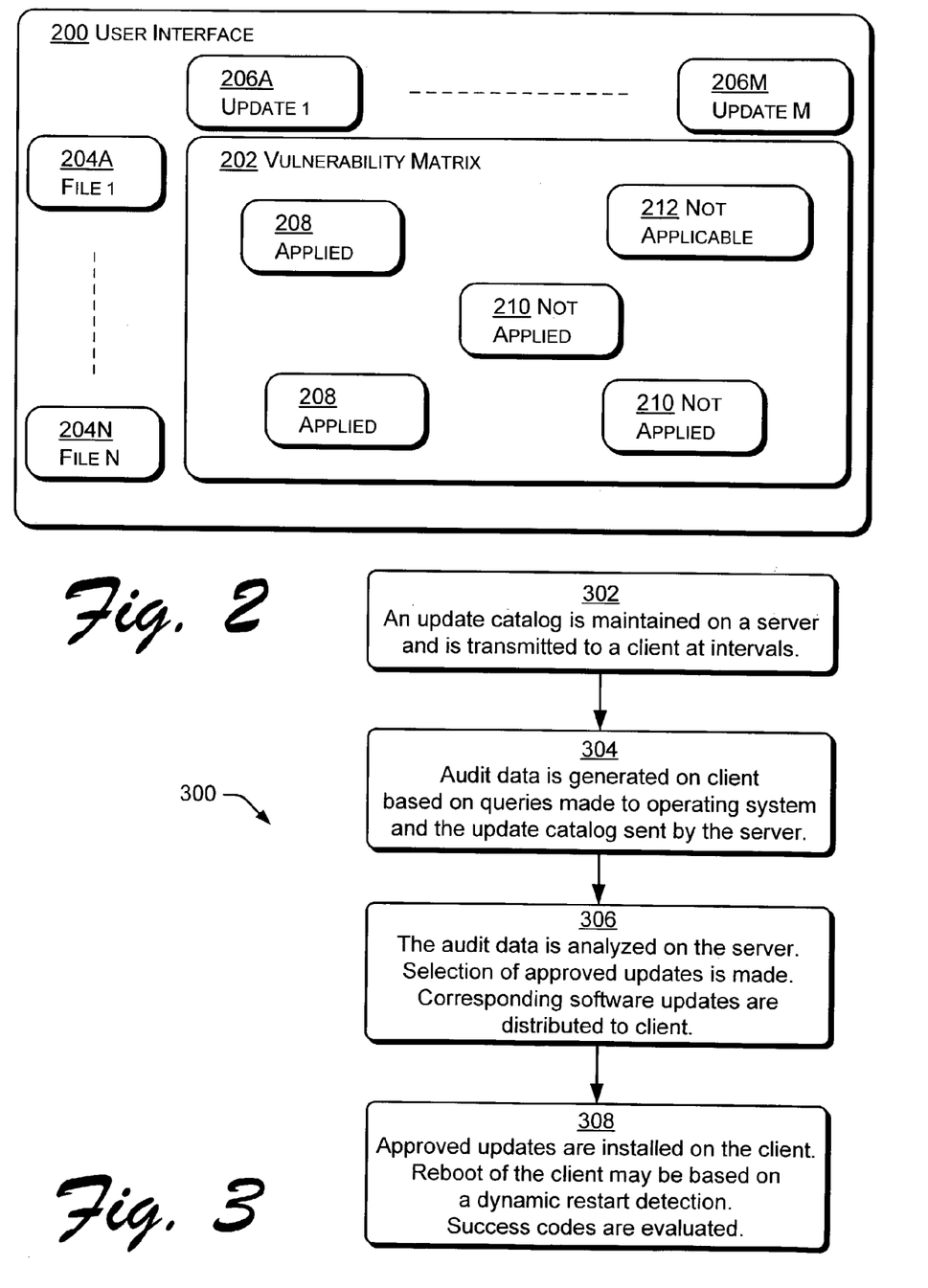
FIG. 2 is a diagram that describes the structure and operation of a vulnerability matrix.
FIG. 3 is a flow diagram that describes the operation of an exemplary software updating system.

In one embodiment of the software update approval tool 120, the approval process may involve presenting the user with a user interface 200, such as that seen in FIG. 2. By viewing the user interface, the IT technician may understand in detail the vulnerabilities facing each client computer 104 on an enterprise network. In an optional configuration, a vulnerability matrix 202 showing the update status for a client computer 104 is present. The matrix 202 may be configured by arraying representations 204A-204N of the files present on the particular client on one axis, and representations 206A-206M of the updates (patches) associated with the files 204 on another axis. The matrix 202 includes representations 208 indicating that a given update was applied to a given file; representations 210 indicating that the update was not applied to the file; and representations 212 indicating that the update is not applicable to the file. By viewing the vulnerability matrix 202, the user may appreciate the vulnerabilities associated with a file present on the client computer 104, as well as whether the vulnerabilities have been eliminated or mitigated by application of the update(s) associated with the file.

Returning to FIG. 1, the software update approval tool 120 allows the IT technician on the server 102 to approve updates for application to the client 104. The software update approval tool 120 is configured to, upon approval of an update, locate and obtain a copy of required updates 124. Accordingly, such approved updates 124 may be obtained by the approval tool 120 from a download center 126. Information on the location of the download center, such as a URL (uniform resource locator) may be obtained from the update catalog 116. Updates obtained for a client may then be replicated to the client using SMS 10 or other software distribution technology.

An exemplary client 104 is configured with an operating system 128 and XML parser 130. SMS client software 132 or similar asset inventory and software distribution software and WMI 134 (Windows® management instrumentation) software 134 or similar are also installed.

A copy of the update catalog 136, received from the server 102 via SMS, provides information regarding the relationship between files potentially present on the client and updates which may need to be installed on those files. A scan tool 138 is configured to call a scan engine 140. Where the scan engine 140 is a program, the scan tool 138 invokes the program. Where the scan engine has been advantageously configured as an API (application programming interface) the scan tool 138 calls the API.

The scan engine 140 is configured to read the update catalog 136, which is typically in the form of an XML document, using the XML parser 130. The scan engine 140 is then configured to query the operating system 128, to determine the exact revision level of programs and/or files present on the client 104. The scan engine 138 may base each query in part on the outcome of previous queries and on the rules—typically expressed as Boolean equations—within the update catalog 136. Accordingly, the scan engine 140 is configured to determine the file type and revision level of all relevant files on the client 104, and additionally to determine the updates that are applicable to the files found. When completed, this information becomes audit data 142.

The scan tool 138 is configured to save the audit data 142 into a queryable interface with the server 102. WMI 134 is such an interface, and a preferred scan tool 138 is configured to save the audit data 142 into WMI 134 and to provide an indication to the SMS client 132 that will cause the audit data 142 to be replicated to the server 102, where it may be aggregated with the audit data of other clients at 122.

A scan tool helper 144 may be configured separately or as part of the scan tool 138. The scan helper 144 manages the process of merging the results of the audit data 142 with service level data. Such service level data may be reflected in modifications to the $Win32_{13}$ PatchState schema or similar data structure. In an exemplary environment, modification to the $Win32_{13}$ PatchState schema may include the addition of fields including: string AuthorizedName (name of the update), datetime TimeDetected; datetime TimeApplied, and datetime TimeAuthorized. Field TimeDetected records the time at which an available update is discovered, thereby implying a time at which a potential security breach is detected. Field TimeAuthorized records the time at which the server 102 (i.e. the IT department administration) authorized the application of the update. Accordingly, the time required by the IT department to act can be derived by comparing the TimeDetected from the TimeAuthorized. Field TimeApplied records the time at which the update was applied, and is an overall measure of the responsiveness of the IT department, and is also a measure of the IT department's responsiveness in installing the update after authorizing the update. Using these modifications to the $Win32_{13}$ PatchState schema, the scan tool helper 144 is able to generate the above service level data associated with TimeDetected, TimeAuthorized and TimeApplied.

A software update installation agent 146 is configured to install the approved update(s) 150 sent by the server 102 via SMS or similar distribution application. In a preferred embodiment, the software update installation agent 146 is configured to call the scan engine 140. The scan engine 140 is configured to again evaluate the files on the client 104 with respect to the update catalog 136, which contains information on updates available, files needing updates, and rules for determining the which updates apply to which files. The output of this second scan—current audit data—of the client's files is put into the scan tool cache 152. The software update installation agent 146 is configured to use the scan tool cache 152 to prevent the installation of updates that are no longer warranted. The installation of updates may become unwarranted, such as in the circumstance where changes in the client computer's file system have occurred more recently then the transmission of the audit data 142 to the server 102. Examples of such a change include installing an updated version of a program, thereby replacing the earlier version which needed an update.

A preferred software installation agent 146 is configured to review the exit codes generated by the installation of the updates 150. A success code table 148 is configured to map a wide variety of initial exit codes into an output exit code that more correctly reflects the underlying meaning of the initial exit code. While zero is traditionally used to indicate a successful update install, and other numbers enumerate different potential errors, this is nomenclature is not always accurate. In some cases, non-zero exit codes indicate a satisfactory update installation due to situations unforeseen by the author of the update or the update installation technology. Such situations include factors related to the software configuration on a particular client. Accordingly, the success code table 148 is configured to map the exit codes generated by the installation of updates into exit codes which more accurately reflect the situation which caused generation of the exit code and provide consistency in success code or exit code meaning.

In particular, differences between exit codes that were generated by different install engine technology may exist. For example, Windows® Installer, Update.XE and I-Express may not be in complete agreement on the precise meaning of a given exit code. Accordingly, the success code table 148 may be configured to map success codes in any desired manner, such as to map numerically different codes having the same meaning into a consistent numeral, thereby resulting in consistent success code interpretation.

In some cases, identification of an update's association with a particular install engine technology provides sufficient information to map the success codes associated with the update. In other circumstances, the success code table 148 must be edited by an IT professional to reflect a special case associated with an particular update. Accordingly, the success code table 148 is editable, configurable and extensible, and can be modified to allow mapping of the success codes generated by any update's installation process into a consistent meaning.

FIG. 3 is a flow diagram that describes an exemplary method 300 by which the software updating system 100 may be operated. At block 302, an update catalog 116 is maintained on the server 102 by a catalog synchronization module 114 or similar. As a part of the maintenance of the update catalog 116, the catalog synchronization module 114 downloads a fresh copy of the update catalog at regular intervals. Each time the update catalog 116 is downloaded, the synchronization module 114 checks applicable codes to determine if the catalog downloaded is authentic. All or any relevant part of the update catalog 116 may be sent at regular intervals to the client 104 for storage at 136.

At block 304, audit data 142 is generated on the client 104 based on queries made to the operating system 128 and based on information from the update catalog 136. The audit data 142 may be generated under the direction of a scan tool 138 by operation of a scan engine 140. The audit data 142 can include an inventory of files within the client computer's file system which need updates and an indication of the applicable update for each file.

At block 306, the audit data 142 may be aggregated with the audit data of other clients on the server 102 in an audit data library 122. The audit data is analyzed, such as by a software update approval tool 120, to determine if each update should be installed. The approved updates are then sent to the appropriate client by SMS or other means.

At block 308, the approved updates 150 are installed on the client 104. The installation process may be performed by a software update installation agent 146 or similar procedure. The scan tool cache 152 is consulted to prevent the installation of updates for which there is no longer a need. Changes in the need for an update could be related to the recent installation of a newer version of a program, for example. The client may be rebooted after installation of one or more updates. The decision to reboot may be governed by dynamic restart detection, as seen in greater detail in FIG. 10. Success codes resulting from the update installation may be mapped according to the success code table 148, as seen in greater detail in FIG. 11. Success code information is utilized in the creation of service level data, which can be used, for example, to provide feedback to a corporate IT department. Such service level data can include time measurements between availability of an update and authorization of the update by the IT department and between availability and installation of the update.

Figure 4:
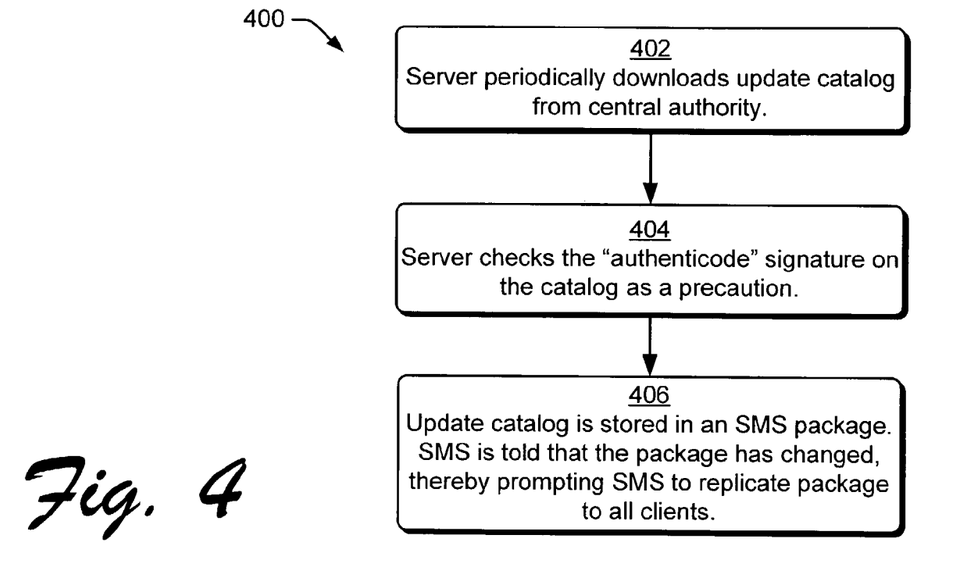
FIG. 4 is a flow diagram that describes the operation of an exemplary catalog synchronization module on a server.

FIG. 4 is a flow diagram that describes an exemplary method 400 by which the catalog synchronization module 114 may be operated, thereby more fully explaining the operation of block 302 of FIG. 3.

At block 402, the server 102 periodically downloads an update catalog 116 from an update authority. The download may be managed by the catalog synchronization module 114 or similar structure, thereby maintaining the copy of the update catalog 116 in a current condition. The update catalog 116 is typically in the form of an XML document, and contains information about available updates, the files and file versions to which the updates apply, and rule governing such application. Due to the complexity of the rules, they may be expressed in the form of Boolean equations.

At block 404, in a typical download of the update catalog 116, the catalog synchronization module 114 checks available codes associated with the update catalog 116 as a conformation of the catalog's authenticity.

At block 406, the update catalog 116 is stored as an SMS package. SMS is told that the package includes changes, i.e. that the package is new. Accordingly, SMS replicates the update catalog 116 to all clients 104.

Figure 5:
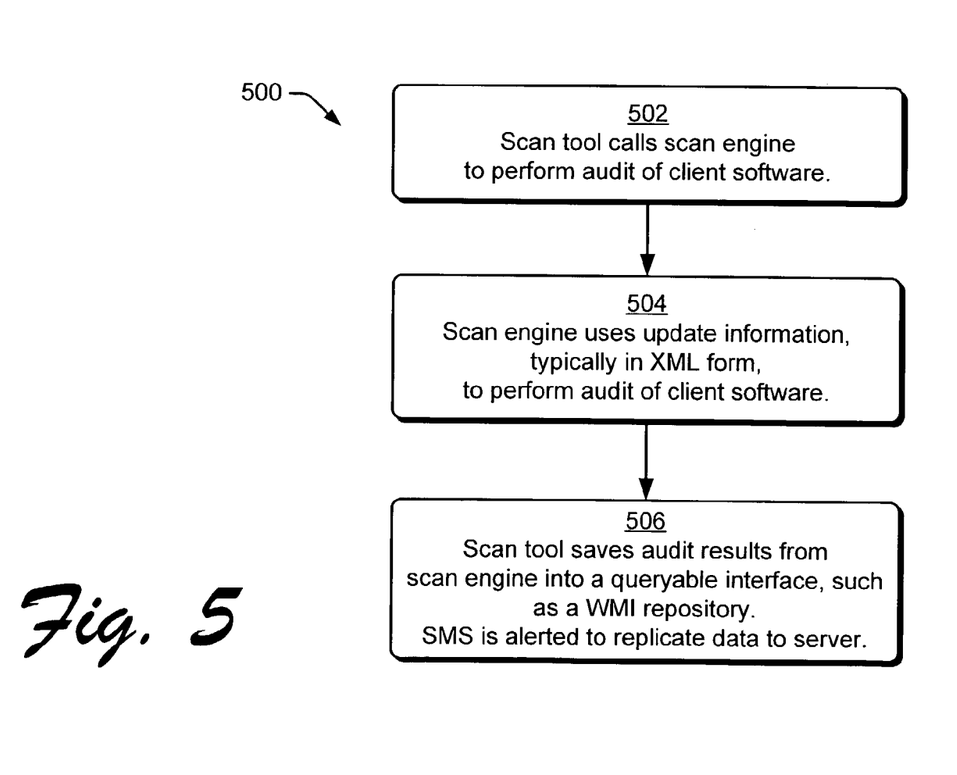
FIG. 5 is a flow diagram that describes the operation of an exemplary scan tool on a client computer.

FIG. 5 is a flow diagram that describes an exemplary method 500 by which the scan tool module 138 on the client 104 may be operated, thereby more fully explaining the operation of block 304 of FIG. 3.

At block 502, the scan tool 138 calls the scan engine 140. In an exemplary configuration, the scan engine 140 is a program that must be called. However, the scan engine 140 may advantageously be configured as an API, thereby simplifying the operation of the scan tool 138.

At block 504, the scan engine 140 uses the update catalog 136, typically in XML form, to perform the audit of the software on the client 104. This audit, described more fully with reference to FIG. 6, results in the production of audit data 122.

At block 506, the scan tool 138 saves the audit results 142 received from the scan engine 140 into a queryable interface with the server 102. In a typical application, the queryable interface with the server is WMI 134 (Windows® management instrumentation). Accordingly, the scan tool 138 populates the audit results into a WMI repository 134 on the client 104. The audit results 142 are then uploaded by SMS to the server 102, typically for storage in a library 122 with the audit results of other clients.

Figure 6:
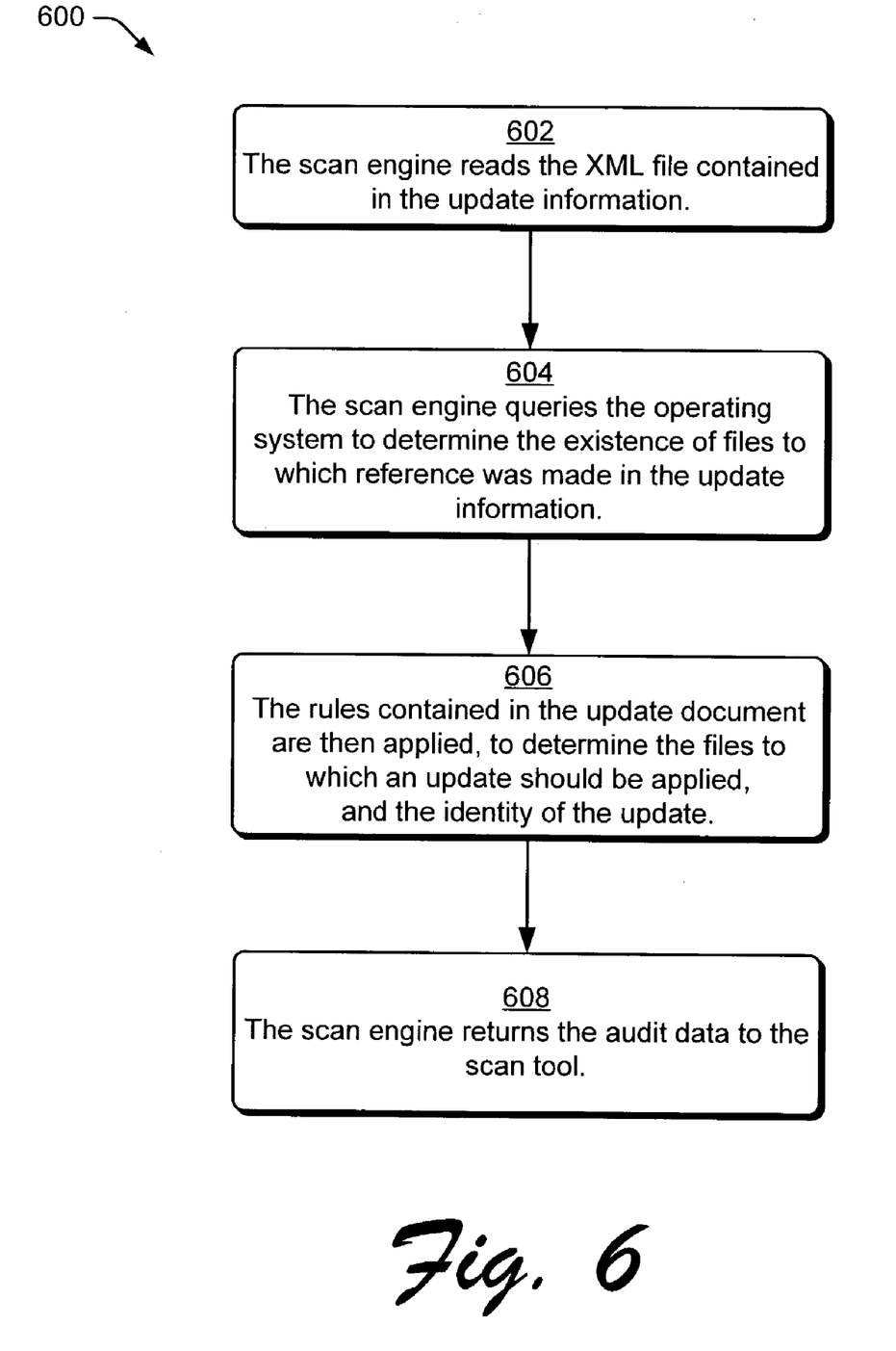
FIG. 6 is a flow diagram that describes the operation of an exemplary scan engine on a client computer.

FIG. 6 is a flow diagram that describes an exemplary method 600 by which the scan engine 140 on the client 104 may be operated, thereby more fully explaining the operation of block 504 of FIG. 5.

At block 602, the scan engine 140 reads the update document 150, which typically contains an XML document describing files, updates and associated rules of application.

At block 604, the scan engine 140 queries the operating system 128 of the client 104 to determine the existence of files to which reference was made in the update document 150. At block 606, the rules contained within the update document are then applied, thereby determining the files to which an update applies and the identity of that update.

At block 608, the scan engine 140 assembles the identities of the files needing an update and the associated updates, and returns this information to the scan tool 138 as the audit data.

Figure 7:
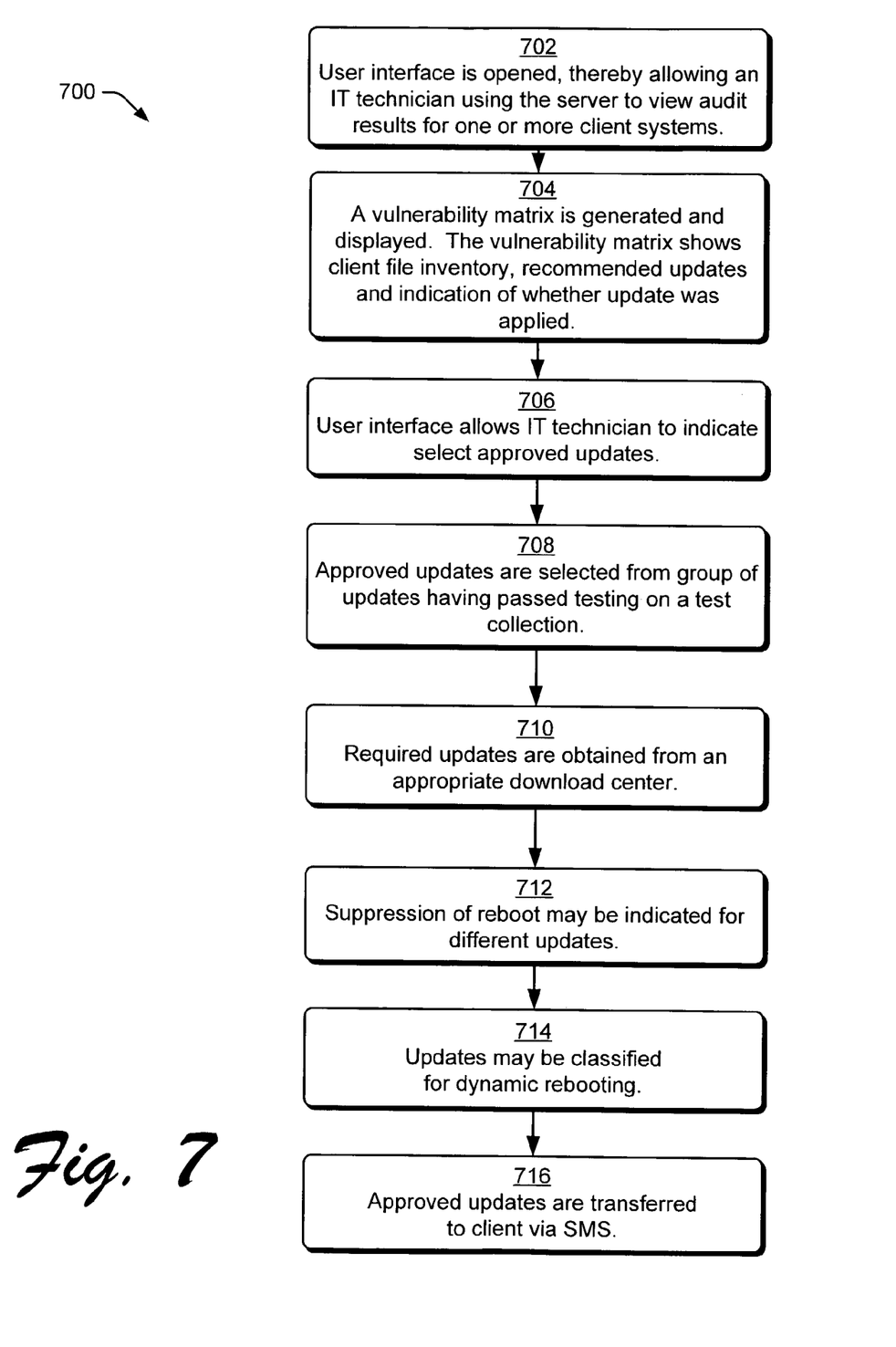
FIG. 7 is a flow diagram that describes the operation of an exemplary software update approval tool on a server.

FIG. 7 is a flow diagram that describes an exemplary method 700 by which a software update approval tool 120 may be operated on the server 102, thereby more fully explaining the operation of block 306 of FIG. 3. The exemplary method 700 allows for the selection of approved software updates, which are then replicated to the appropriate client computers for application.

At block 702, a user interface is opened, thereby allowing an IT technician using the server 102 to view audit results for one or more client systems. At block 704, optionally, a vulnerability matrix 200 is generated and displayed. The vulnerability matrix 202 shows client file inventory, recommended updates and indicates if the update has been applied. At block 706, the user interface allows the IT technician to indicate the approved updates (patches). The approval process could be presented to the user in the form of a wizard, or other applicable format. The approval could be based in part on the vulnerability matrix 200 the technician viewed. At block 708, in some applications, the user interface is restricted to allow selection of updates only from an approved group of updates having passed testing on a test collection of computers. If application of the update to the test collection of computers was successful, then the updates are included among those from which the IT professional may select for installation on a given system. In some applications, the IT professional may be challenged by the user interface to state the name of a test collection of systems upon which the update was installed in the testing process, or other details which confirm that testing was performed.

Figure 10:
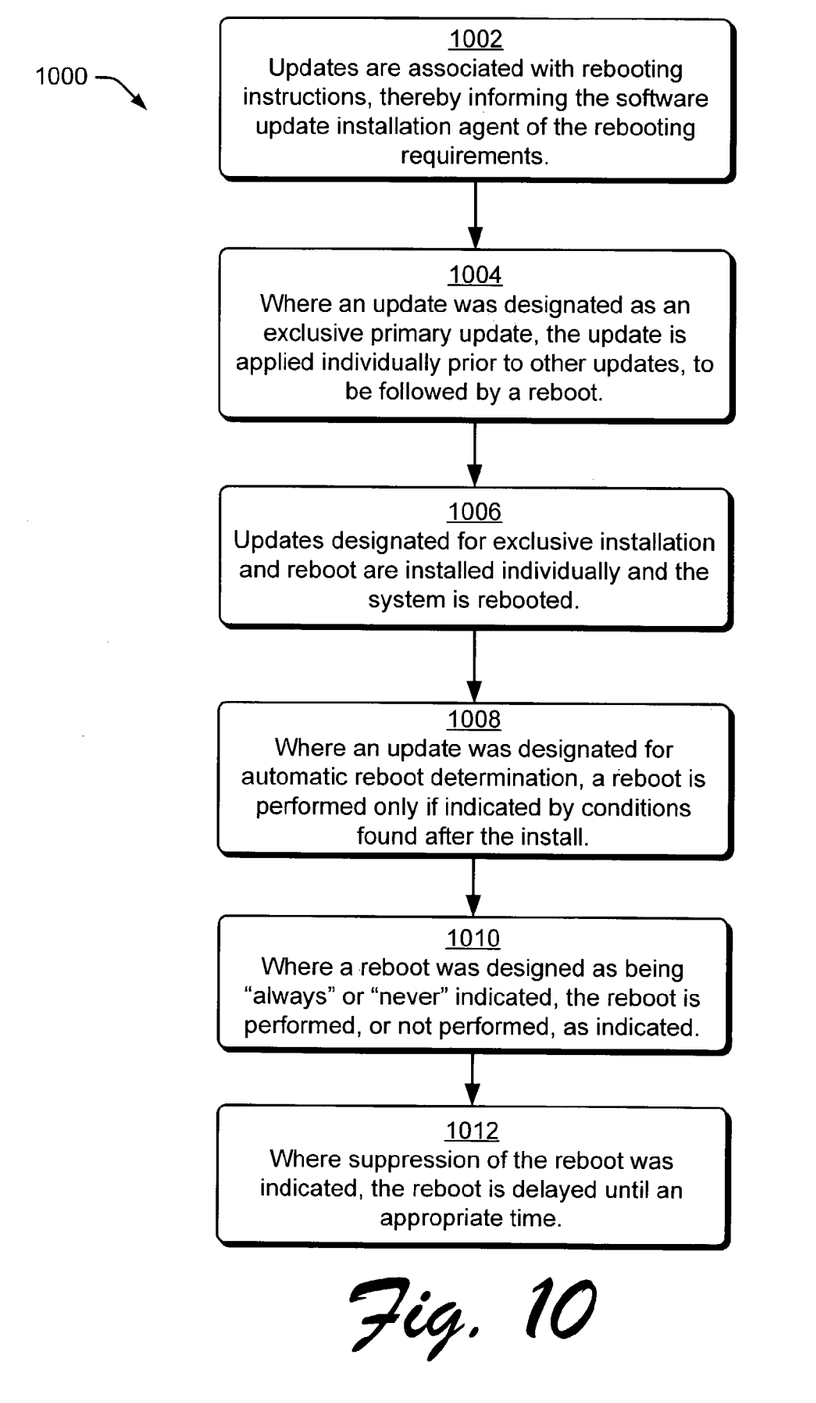
FIG. 10 is a flow diagram that describes exemplary conditions controlling rebooting a client computer.

At block 710, the approved updates 124 are obtained, perhaps from an update download center 126. At block 712, suppression of reboot may be indicated for some updates. At block 714, dynamic rebooting may be indicated for other updates. FIG. 10 discusses rebooting in greater detail. At block 716, the updates are then transferred to the appropriate client 104 via SMS or other file transfer utility.

Figure 8:
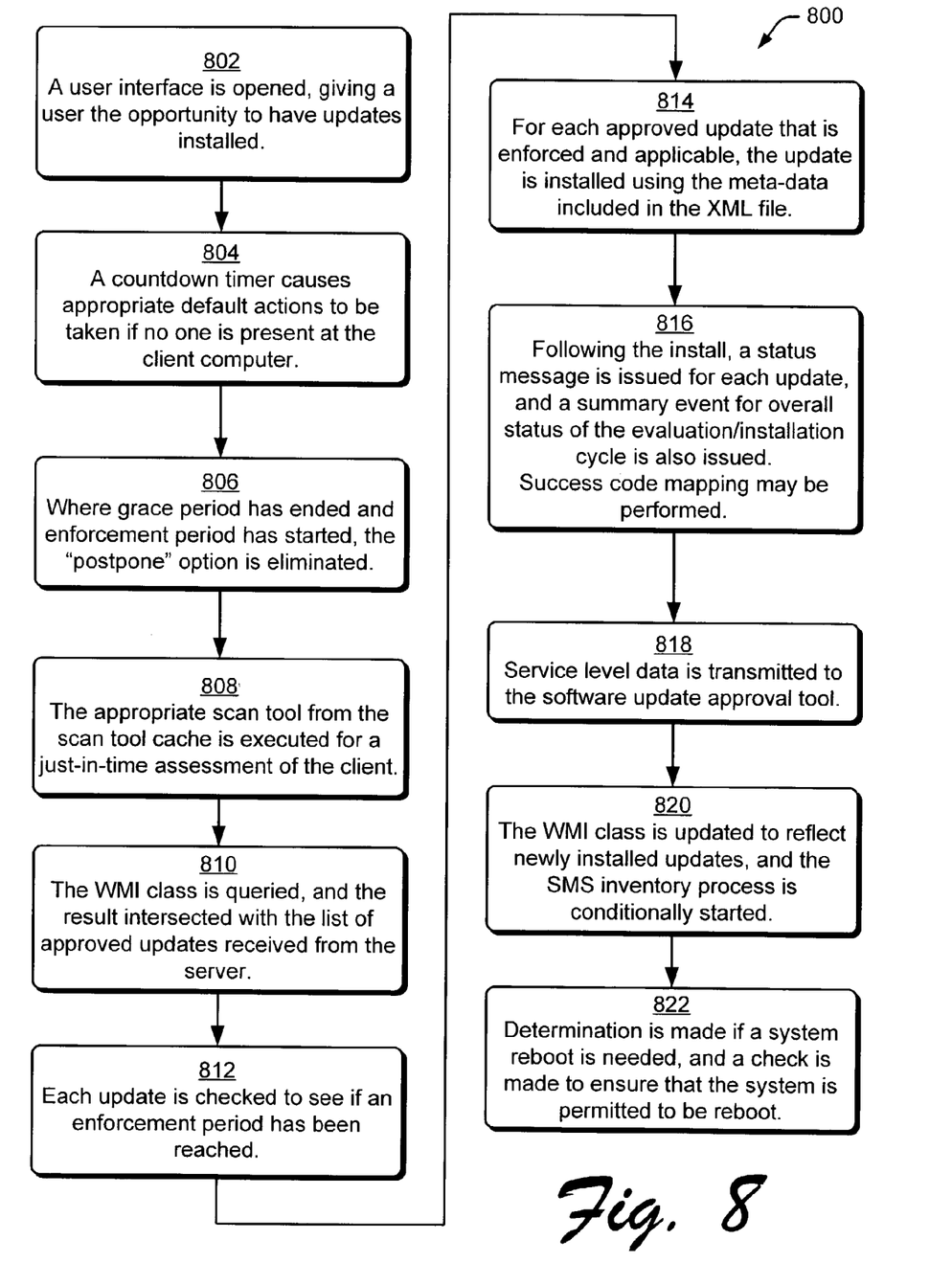
FIG. 8 is a flow diagram that describes the operation of an exemplary software update installation tool on a client computer.

FIG. 8 is a flow diagram that describes an exemplary method 800 by which a software installation agent, such as agent 146, may be operated on the client 104, thereby more fully explaining the operation of block 308 of FIG. 3. The exemplary method 800 installs the updates sent by the server 102 onto the client 104.

At block 802, a user interface may be opened on the client 104 to announce to the user the opportunity to have updates installed at this time. At block 804, where a user interface has opened, a countdown timer causes appropriate default actions to be taken upon expiration of a timed period if no one is present at the client computer. The default action may be set by the corporate IT department, and may include "install" and "postpone". Where the default is "install," the installation of the updates proceeds after the timed period has expired. Where the default action is "postpone," the installation is delayed. At block 806, where a grace period has ended and the enforcement period has started, the "postpone" option is eliminated, and may appear to be a "grayed" option on the user interface. In this circumstance, the remaining default, "install," is invoked, and the installation of the updates proceeds.

At block 808, the appropriate scan tool 138, 140 is executed to refresh the scan tool cache 152. By refreshing the scan tool cache 152, it can be determined if the status of files on the client 104 has changed, thereby changing the need for one or more updates to be installed. The audit results of the scan tool cache 152 may be deposited into a queryable interface, such as WMI.

At block 810, the WMI class is queried, and the results (i.e. the updates and their associated target files) are intersected with the list of approved updates received from the server. Accordingly, where WMI indicates that there is no longer a need to install a given update, or where the server did not forward an update (perhaps due to approval rejection by the IT technician) one or more updates will not be installed.

At block 812, each update to be installed is checked to determine if an enforcement period has been reached. In some cases, the IT department operating the server 102 will provide a grace period, followed by an enforcement period. During the grace period, the update can be rejected by the client. During the enforcement period, the update cannot be rejected by the client.

At block 814, for each approved update that is enforced and still applicable (in view of the scan cache), the update is installed using the meta-data included in the XML file (the update document 150).

At block 816, following install, a status message is issued for each update, and a summary message reflecting the overall status of the evaluation/installation cycle is issued. In one embodiment, the status message will observe a SuccessCodes mapping table feature, wherein mapping of non-zero exit codes into success states is allowed. Success code mapping is discussed in greater detail in the discussion of FIG. 11. At block 818, the success codes may be included in service level data, which may be transmitted to the software update approval tool 120 or other location on the server 102.

At block 820, the WMI class is updated to reflect newly installed updates, and the SMS inventory process is conditionally started. Additionally, service level data may be transmitted to the software update approval tool 120 or other location. For example, service level data may include information indicating the length of a time period between update availability and update installation.

At block 822, determination is made if a system restart is needed, and a check is made to ensure that the system is permitted to be restarted. Additional detail associated with system restarting is seen in the discussion of FIG. 10.

Figure 9:
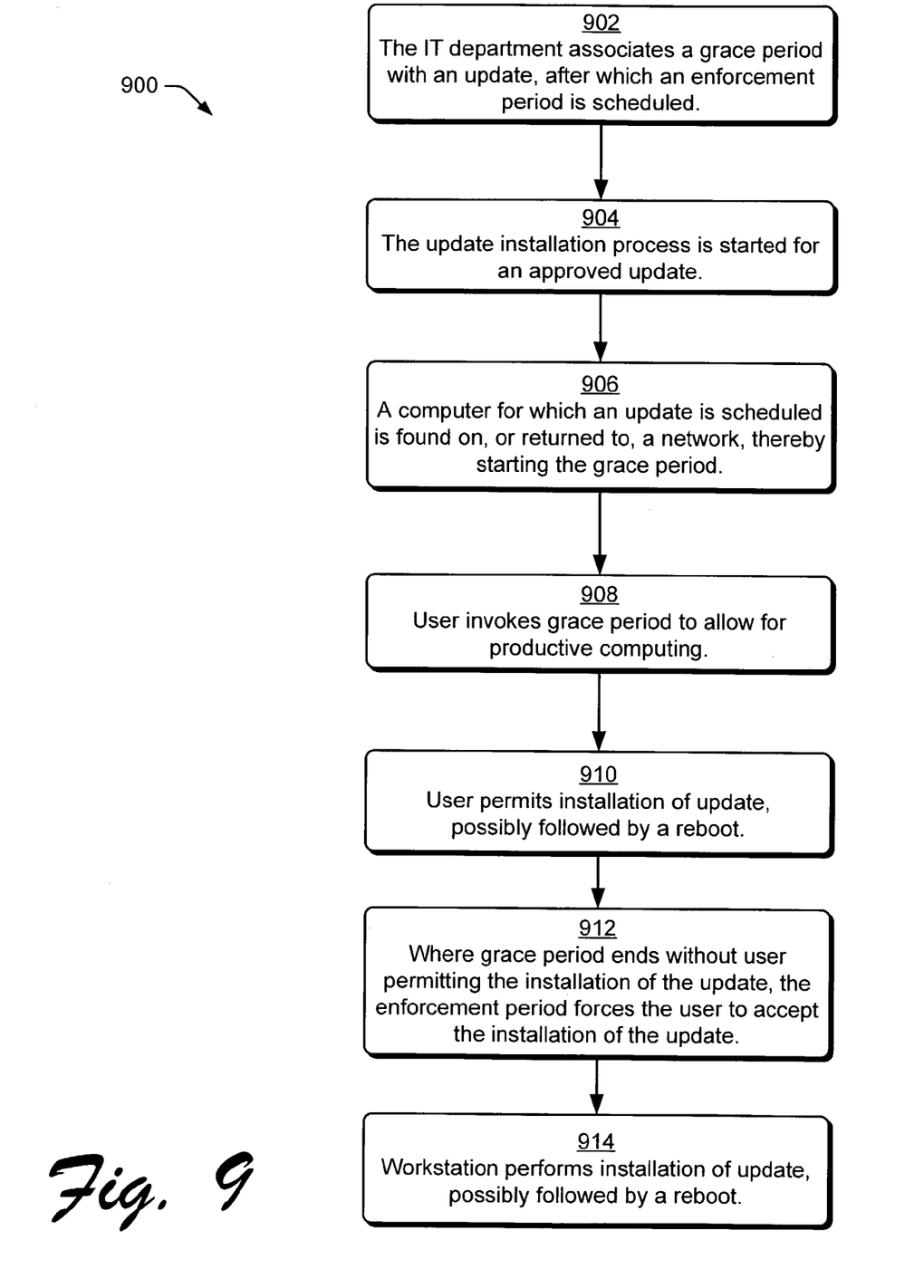
FIG. 9 is a flow diagram that describes the operation of exemplary grace periods and enforcement periods on a client computer.

FIG. 9 is a flow diagram that describes an exemplary method 900 by which grace periods and enforcement periods may be employed to balance the need to install updates with the need for knowledge workers to efficiently utilize their computers.

At block 902, the IT department associates a grace period with an update, after which an enforcement period is scheduled. At block 904, the update installation process is started for an approved update having assigned grace and enforcement periods. At block 906, a computer for which an update is scheduled is found on a network—or returned to a network, such as in the case of a laptop computer)—thereby triggering the start of the grace period. At block 908, the user may elect to invoke the grace period to delay installation of the update. This action allows the user to continue working. At block 910, optionally, the user may permit installation of one or more updates, which may be followed by a reboot. At block 912, where the grace period ends prior to permitting the installation of one or more updates, the enforcement period begins. The enforcement period forces the user to accept the installation of the update. At block 914, the update(s) is/are installed, possibly followed by a reboot.

FIG. 10 is a flow diagram that describes an exemplary method 1000 by which dynamic restart detection may be performed, thereby increasing the efficiency of the update process. At block 1002, updates may be associated with rebooting instructions, thereby informing the software update installation agent 146 of the rebooting requirements. At block 1004, where an update was designated as an exclusive primary update, the update is applied individually prior to other updates, to be followed by a reboot. Examples of such updates include service packs, which combine many updates. Application of such an update may obviate the need for other updates; accordingly, such an update should be applied first. At block 1006, updates designated for exclusive installation and reboot are installed individually and the system is rebooted. An example of such an update is a video driver, which is sufficiently important that it is preferably installed individually prior to a reboot. At block 1008 where an update was designated for automatic reboot detection, a reboot is performed only if indicated by conditions found after the install. Such conditions may include the discovery of files which are left over by updated applications, and which indicate the need for a reboot. At block 1010, where a reboot was designated as being "always" or "never" indicated, the reboot is performed or not performed, as indicated.

At block 1012, where suppression of the reboot was indicated, the reboot is delayed until an appropriate time. Where suppression is indicated, if is frequently advisable to time the application of the updates a short time before a scheduled reboot. This is particularly true where the install is being performed on a server, which may have a rigorous schedule governing system rebooting which is intended to maximize uptime.

Figure 11:
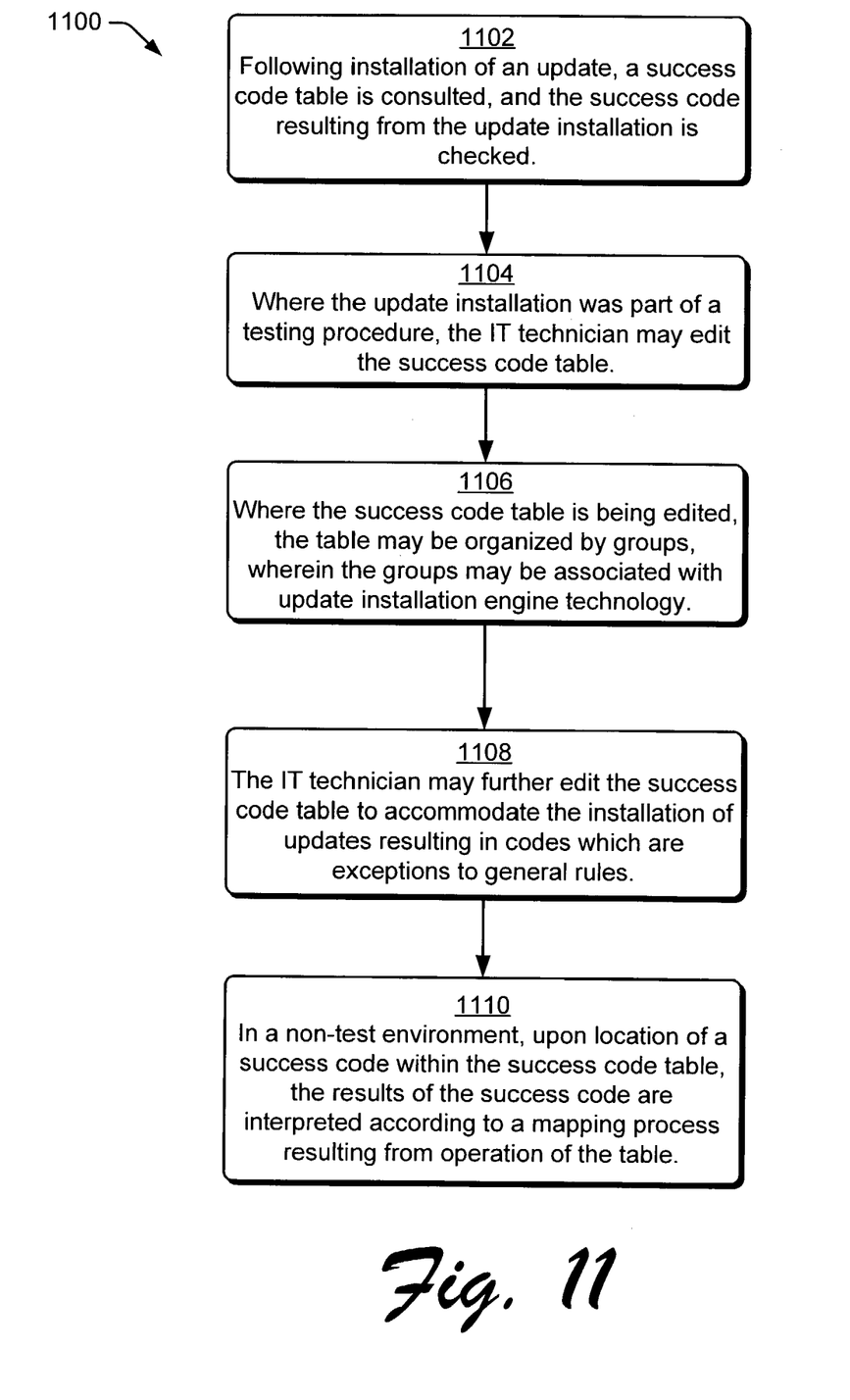
FIG. 11 is a flow diagram that describes exemplary mapping of success codes resulting from update installations on a client computer.

FIG. 11 is a flow diagram that describes an exemplary method 1100 by which a success code table 148 may be maintained, and by which success code mapping may be performed in a manner which maps success codes having misleading or inconsistent meaning to success codes having an expected and/or appropriate meaning.

At block 1102, following installation of an update, a success code table is consulted, and the success code resulting from the update installation is checked.

At block 1104, where the update installation was part of a testing procedure, the IT technician may edit the success code table 148. At block 1106, the success code table 148 may be organized by groups, where the updates in each group have success codes with similar meaning. For example, each groups of updates may be configured for installation by similar update installation engine technology. At block 1108, the IT technician may further edit the success code table to accommodate the installation of updates resulting in codes which are exceptions to general rules.

At block 1110, where the installation of the update was not associated with a testing procedure, location of the success code resulting from the installation within the success code table 148 allows mapping of the success code. Accordingly, the result of the mapping provides information that is consistent with expectations.

Although the disclosure has been described in language specific to structural features and/or methodological steps, it is to be understood that the appended claims are not limited to the specific features or steps described. Rather, the specific features and steps are exemplary forms of implementing this disclosure. For example, actions described in blocks of the flow diagrams may be performed in parallel with actions described in other blocks, the actions may occur in an alternate order, or may be distributed in a manner which associates actions with more than one other block. Moreover, the elements of the methods disclosed may be performed by any desired means, such as by the execution of processor-readable instructions defined on a processor-readable media, such as a disk, a ROM or other memory device, or by operation of an ASIC (application specific integrated circuit) or other hardware device.

The invention claimed is:

1. A method by which a server assists client computers to install software updates comprising:
    maintaining an update catalog on the server and pushing the update catalog from the server to the client computers via a network, wherein the update catalog includes update information identifying available updates;
    generating audit data on the client computers based on queries made to operating systems of client computers and queries to the update catalog sent to the client computers, wherein the audit data is generated according to a data structure, comprising:
        a first data field containing data indicating a file within the client's file configuration;
        a second data field containing data indicating if an update is applicable to the file indicated in the first data field;
        a third data field containing data indicating when existence of the update to the file was detected in the update catalog;
        a fourth data field containing data indicating when the update to the file was authorized; and
        a fifth data field containing data indicating when the update to the file was applied;
    receiving, at the server, the audit data, wherein the audit data is analyzed and approved updates selected;
    distributing the approved updates to the client computers; and
    installing the approved updates on the client computers, wherein the installing comprises:
        executing a scan tool on each client, wherein the scan tool provides a just-in-time assessment of software on the client and thereby supersedes the audit data and determines if a status of files on the client has changed; and
        intersecting results of the just-in-time assessment with approved updates distributed to the client, and installing updates that are both approved by the server and indicated by the just-in-time assessment.

2. A method of claim 1, wherein the update catalog includes rules and file version information, and the generating of the audit data of a client comprises:
    applying the rules to the file version information to produce the audit data; and
    checking the audit data to see if available updates obviate a need for any updates identified by the audit data.

3. A method as recited in claim 1, further comprising:
    associating the installable updates with rebooting instructions.

4. A method as recited in claim 3, wherein the rebooting instructions comprise further instructions selected from a group of instructions comprising:
    rebooting after installation of an exclusive primary update;
    rebooting only if indicated after installation of an update; and
    suppressing a reboot after installation of an update.

5. A method as recited in claim 1, further comprising:
    obtaining a success code resulting from the installation of the approved update; and
    mapping the success code for consistency in success code meaning.

6. A method as recited in claim 1, further comprising:
    an indication of time elapsed from the indication that the update is applicable to the indication that the update was applied.

7. A method as recited in claim 1, wherein generating the audit data comprises:
    obtaining specific information about files stored on a client; and
    preparing the audit data for a client by using rules in the update catalog to determine which updates are needed based on the specific information.

8. A method as recited in claim 1, wherein selecting the approved updates comprises:
    providing a user interface on the one or more servers for selection of approved updates; and
    obtaining the approved updates based on selections made within the user interface.

9. A method as recited in claim 1, further comprising synchronizing the update catalog on the server with an authority to keep the update catalog current.

10. A method as recited in claim 1, further comprising:
obtaining rules for the update catalog as an XML document from an update authority;
checking a code to determine if the XML document has been tampered with; and
storing the XML document in a package for transmission to the client.

11. A method by which one or more servers assists client computers to install software updates comprising:
pushing an update catalog from the server to the clients via a network, wherein the update catalog includes update information identifying available updates, including indicia of files to which the available updates apply, wherein the update information can be compared by the clients to inventory thereof to identify updates individually applicable to the clients;
receiving, from the clients, audit data identifying candidate updates individually applicable to the respective clients, the audit data having been generated by automated tools at the clients that perform audits of the clients by comparing inventory of the client computers against the update information in the catalog, wherein the audit data is generated according to a data structure, comprising:
a first data field containing data indicating a file within the client's file configuration;
a second data field containing data indicating if an update is applicable to the file indicated in the first data field;
a third data field containing data indicating when existence of the update to the file was detected in the update catalog;
a fourth data field containing data indicating when the update to the file was authorized; and
a fifth data field containing data indicating when the update to the file was applied;
determining, at the one or more servers, based on the audit data from the clients, which candidate updates to push to which of the clients; and
pushing to the clients installable updates that correspond to the determined candidate updates, where one or more updates sent to a client correspond to one or more candidate updates identified by that client and determined for installation by the one or more servers.

12. A method of claim 11, wherein the update catalog includes rules and file version information, and an audit of a client comprises:
applying the rules to the file version information to produce the audit data; and
checking the audit data to see if available updates obviate a need for any updates identified by the audit data.

13. A method as recited in claim 11, further comprising:
associating a grace period and an enforcement period with the installable updates;
allowing a user to defer the installable updates during the grace period; and
enforcing installation of the installable updates during the enforcement period.

14. A method as recited in claim 11, further comprising:
associating the installable updates with rebooting instructions.

15. A method as recited in claim 14, wherein the rebooting instructions comprise further instructions selected from a group of instructions comprising:
rebooting after installation of an exclusive primary update;
rebooting only if indicated after installation of an update; and
suppressing a reboot after installation of an update.

16. A method as recited in claim 11, further comprising:
installing an approved update on a client from among the approved updates;
obtaining a success code resulting from the installation of the approved update; and
mapping the success code for consistency in success code meaning.

17. A method as recited in claim 11, further comprising:
an indication of time elapsed from the indication that the update is applicable to the indication that the update was applied.

18. A method as recited in claim 11, wherein an audit of a client comprises:
obtaining specific information about files stored on a client; and
preparing the audit data for a client by using rules in the update catalog to determine which updates are needed based on the specific information.

19. A method as recited in claim 11, wherein determining which candidate updates to install comprises:
providing a user interface on the one or more servers for selection of approved updates; and
obtaining the approved updates based on selections made within the user interface.

20. A method as recited in claim 11, further comprising synchronizing the update catalog with an authority to keep the update catalog current.

21. A method as recited in claim 11, further comprising:
obtaining rules for the update catalog as an XML document from an update authority;
checking a code to determine if the XML document has been tampered with; and
storing the XML document in a package for transmission to the client.

22. A method as recited in claim 11, further comprising:
maintaining a scan tool cache on a client to include current audit data to prevent installation of an unneeded update.

* * * * *